United States Patent [19]

Reed

[11] 4,041,393
[45] Aug. 9, 1977

[54] VEHICLE VOICE DATA LINK

[75] Inventor: Roger R. Reed, Arlington, Mass.

[73] Assignee: Cadec Systems, Inc., Burlington, Mass.

[21] Appl. No.: 549,887

[22] Filed: Feb. 14, 1975

[51] Int. Cl.² .............................................. H04B 1/00
[52] U.S. Cl. ................................................... 325/54
[58] Field of Search ...................... 325/53, 54, 58, 51, 325/57, 65, 55; 340/147 R, 147 LP; 246/187 B; 343/177–179; 179/15 AS

[56] References Cited

U.S. PATENT DOCUMENTS

| 3,376,509 | 4/1968 | Willcox et al. | 325/53 |
| 3,646,580 | 2/1972 | Fuller et al. | 325/53 |
| 3,739,278 | 6/1973 | Gautney et al. | 325/58 |
| 3,819,932 | 6/1974 | Auer, Jr. et al. | 246/187 B |
| 3,882,465 | 5/1975 | Cook et al. | 340/147 R |
| 3,939,417 | 2/1976 | Cannalte et al. | 325/53 X |

FOREIGN PATENT DOCUMENTS

| 1,038,605 | 12/1953 | France | 325/54 |

Primary Examiner—Richard Murray
Attorney, Agent, or Firm—Weingarten, Maxham & Schurgin

[57] ABSTRACT

A communication system operative on a time-shared basis on a single frequency between a plurality of mobile vehicles such as trucks and buses and one or more central base stations and associated dispatcher offices. The communication system provides a data link between the vehicles and the dispatcher for vehicle status information and commands as well as a priority interrupt voice channel on the same frequency for occasions requiring voice communication.

18 Claims, 7 Drawing Figures

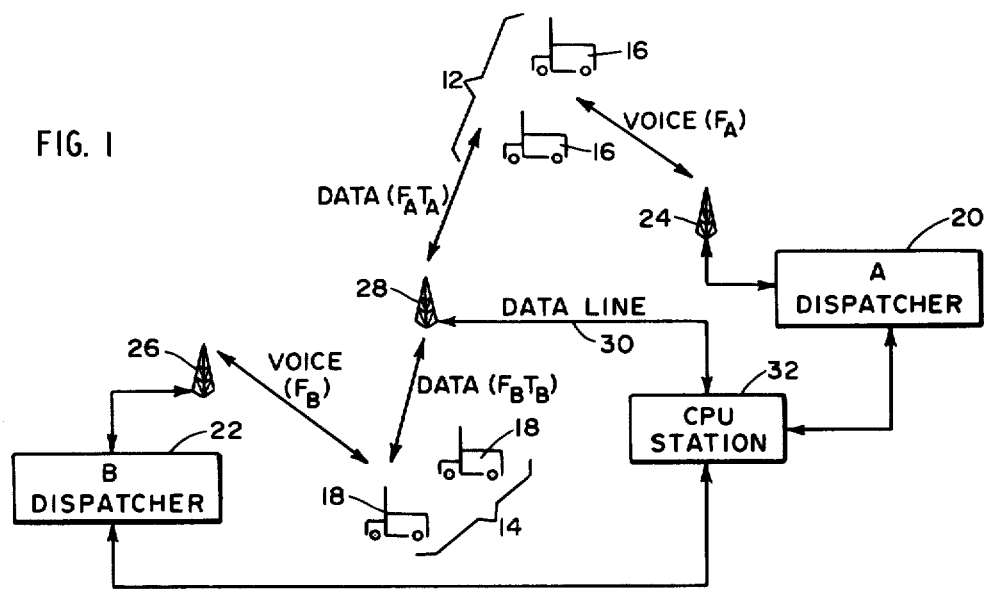
FIG. 1
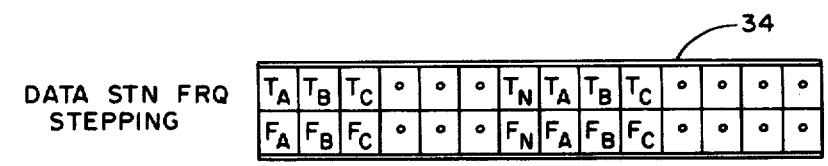
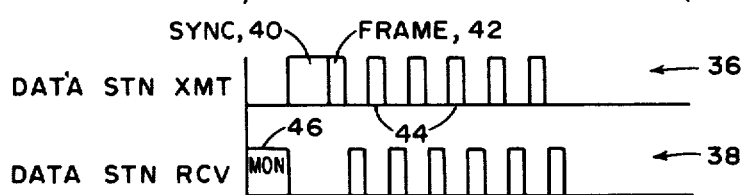
FIG. 2
FIG. 3
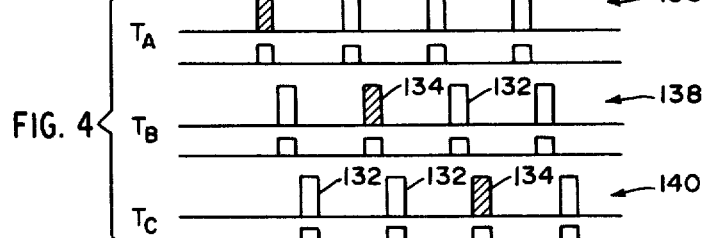
FIG. 4
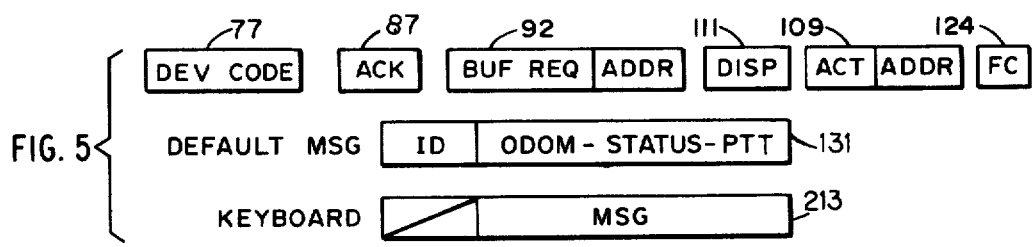
FIG. 5

VEHICLE VOICE DATA LINK

FIELD OF THE INVENTION

The present invention relates to multiplex communication systems and in particular to a system for selectively communicating between a plurality of mobile vehicles and a base station.

BACKGROUND OF THE INVENTION

In my prior U.S. Pat. No. 3,774,215, assigned to the same assignee as the present application and specifically incorporated herein by reference, there is disclosed a system for providing position information between a plurality of mobile vehicles and a central station using Omega transmissions and time-shared data communication between the mobile vehicles and a central station. Applications for data communication between a central or base station and a plurality of mobile satellite stations may occur where exact position information as obtained by the Omega system is not required, but instead a full information exchange capability in both data and voice formats is desired. Such applications may be found in the trucking industry or in regional transit systems.

The typical trucking system can greatly benefit from having available at the dispatcher's office a variety of information on the condition of the individual trucks including the total load-on-board, bill of lading and routing sequence of the truck, status or emergency conditions of vehicle engine or other components. Additionally, the dispatcher may wish to transmit data to the vehicle to specify certain actions to be performed, such as route changes or to send communications coordination signals for voice operation, such as ring and channel switching commands. A large repertory of predetermined data messages is thus needed for communication between the vehicles. By using such a repertory in a time-shared data format, it should be possible to communicate with a larger number of mobile vehicles using time-sharing or multiplexing techniques.

Conditions can be expected, however, which cannot be satisfactorily handled by communicating through a predetermined repertory of data messages and which necessitate the occasional use of direct voice communication. In such cases, it is desirable to have a system which provides for occasional interruption of the more efficient time-shared data communication on a priority basis to permit direct voice communications between a dispatcher and a particular mobile vehicle. Since dual frequency assignments are less available than single frequency assignments, the use of a single frequency for both voice and data is desired.

BRIEF SUMMARY OF THE INVENTION

In a preferred embodiment of the present invention, a vehicle data communication system is provided which establishes a time-shared data link between at least one base station and a plurality of mobile vehicles for efficient communication of normally expected information exchange but which permits a priority interruption for voice communication between a station and an individual mobile vehicle on the same frequency to handle certain matters necessitating individual voice contact.

In implementing the preferred embodiment of the present invention, a central processing station is located to communicate with a plurality of dispatchers such as are employed by trucking lines and regional transit systems, each trucking line or transit system being typically assigned to a single frequency. The central processing system operates with a data transmission and reception system on a plurality of stepped frequencies, one corresponding to each of the transit lines at their assigned frequency. A data set is provided at each of the mobile vehicles of the transit or trucking systems for communication with the central processing system through the data communication facility in a specific time slot established through a time-slot acquisition procedure carried out by means of the radio data circuit. This data circuit provides a data communication link between the individual mobile vehicle and the dispatcher for that particular trucking line or transit system. A repertory of data communication codes used for data signal transmission between the mobile vehicles and dispatcher permits the dispatcher to send information to the driver on route and at the same time for the driver to identify either manually through keyboard entry of load and destination data of freight consignments, or automatically, through sensor monitoring of vehicle status to the dispatcher. The system permits pertinent statistics to be assembled by the dispatcher regarding each vehicle or consolidated statistics for the fleet, as well as important on-route information to be disseminated to the mobile vehicles on a very efficient basis to a large number of vehicles on a single frequency.

A voice detection and override system responds to a voice signal on the individual channels from either the voice base stations or individual mobile vehicles to suppress data transmission. This enables a brief interval of voice communication so that certain information not in the repertory of data codes can be exchanged between the dispatcher and individual mobile vehicles. As an option to such a system, it is additionally possible to activate voice communication through an initial data transmission which selectively rings an individual mobile vehicle to initiate voice communication without disturbing other vehicle voice sets in the system.

BRIEF DESCRIPTION OF THE DRAWING

These and other features of the present invention are fully set forth below in the detailed description of the preferred embodiment, presented as a nonlimiting example, and in the accompanying drawing of which:

FIG. 1 is a quasi-pictorial view of an area of coverage for the communication system of the present invention;

FIGS. 2-5 are timing diagrams useful in explaining the present invention;

DETAILED DESCRIPTION OF THE PREFERRED EMBODIMENT

Figure 6:
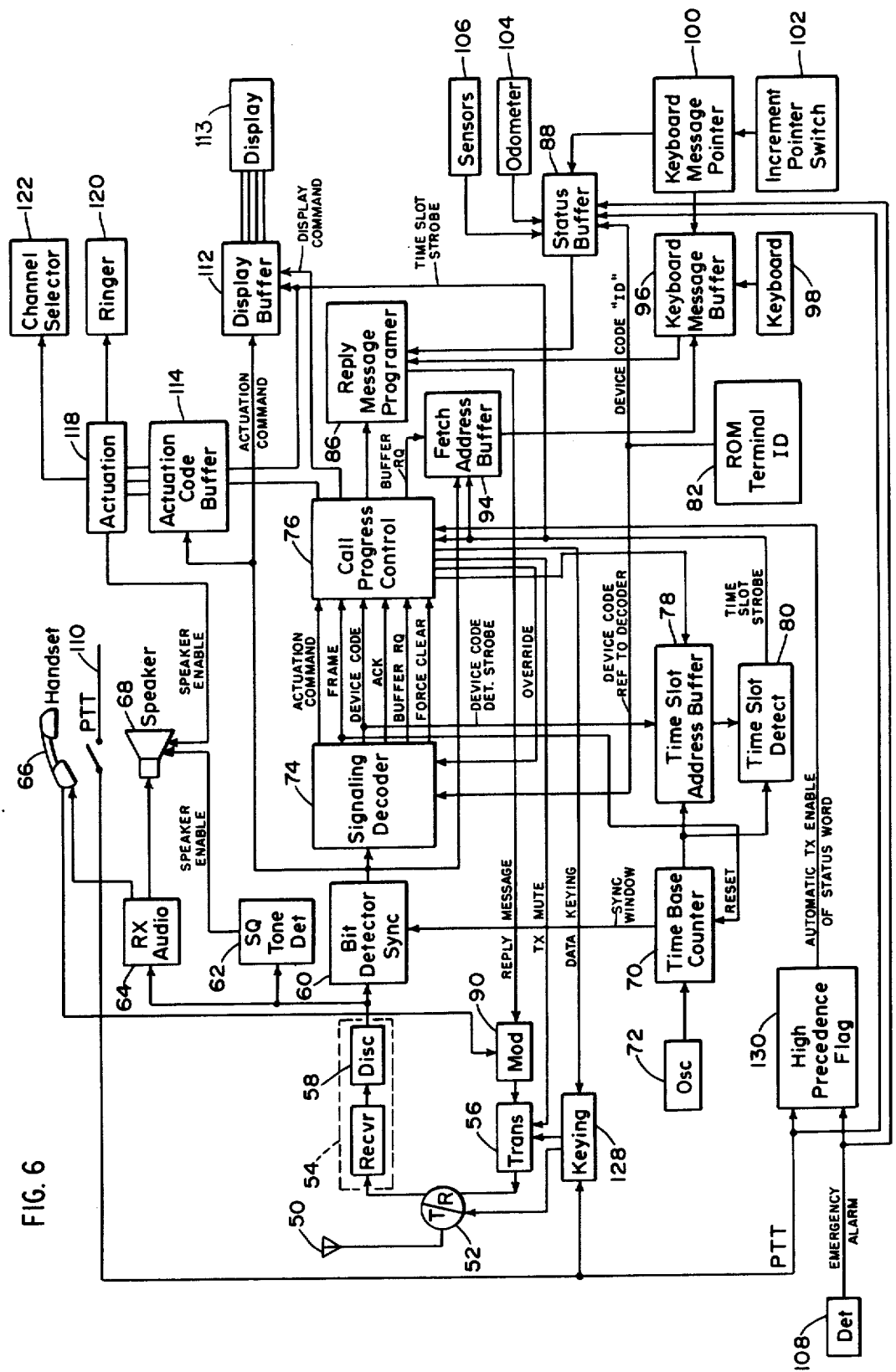
FIG. 6 is a diagram of the electronic elements located at a vehicle in the present invention.

The present invention contemplates a communication system for use between one or more base data stations and a plurality of mobile vehicles. Typically, the mobile vehicles will include vehicles from several different transportation systems and may also include one or more regional public or private transit systems. The base data station will accordingly have associated with it a dispatcher office for each of the transportation lines or transit systems. A communication system will be so oriented as to provide direct data and voice communication between a dispatcher office and each of the mobile vehicles which are in the control of that office. As typically happens, each transportation entity will have its own assigned single frequency and the data communication portion of the system will be operative for communication between the dispatcher and the mobile vehicles associated with that transportation entity on that frequency for a fixed short interval stepping to other frequencies for other transportation entities served by the communication system in a time-sequenced manner. For providing high efficiency in data communication between the dispatcher and all mobile vehicles for each transportation organization, the communication system employs a time-shared data communication format and a time-slot acquisition routine to assign and drop individual mobile vehicles from sepcific time-slot assignments. In order to handle other than pre-programmed data messages, a priority interrupt voice communication system is provided in the system of the present invention to interrupt the data communications on the frequency assigned to the particular transportation system involved in order to handle unusual situations by direct voice communication.

With respect to FIG. 1, the general capability of the communication system of the present invention may be more clearly understood by reference to the quasi-pictorial illustration of an area of coverage for the present communication system. As shown in FIG. 1, first and second groups of mobile vehicles 12 and 14 consist each of a plurality of vehicles 16 and 18 respectively. Additional groups of mobile vehicles would typically be included within the communication system, only two being shown here for purposes of illustration. The groups 12 and 14 would represent respective transportation organizations such as a trucking company, bus line or regional transportation and commuter system.

Each of the vehicles 16 and 18 have a radio communication set adjusted for communication over a frequency assigned to that transportation organization by the Federal Communications Commission. Accordingly, the groups of vehicles 12 and 14 will have different frequencies as represented by the frequencies $F_A$ and $F_B$ respectively. Each group of vehicles 12 and 14 has direct voice communication through its communication set to respective dispatcher stations 20 and 22 via a transmission and reception facility 24 and 26 for each dispatcher. The voice communication is on the respective frequencies $F_A$ and $F_B$ assigned to the individual transportation organizations. Data communication through the communication set of each of the vehicles 16 and 18 is provided through a single data communication facility 28 and data line 30 to a central processing unit station 32. Data is then distributed from CPU station 32 to the individual dispatcher stations 20 and 22. Since it is typically more efficient to provide centralized data communication with each of the vehicles 16 and 18, a single communication facility 28 has been illustrated in FIG. 1, although it is to be understood that a plurality may be used, separate ones for each frequency or for greater geographical coverage or otherwise as desired. Similarly, since each dispatcher office for the respective transportation organizations typically will have a voice capability, there is efficiency in utilizing voice communication through existing communication facilities 24 and 26 of the individual dispatchers, although it is to be understood that other arrangements are contemplated within the scope of the present invention.

The central data communication facility 28 operating from the CPU station 32 over data line 30 provides data communication on all frequencies for the respective transportation organizations in a frequency stepping pattern illustrated in FIG. 2 in a diagram 34. As illustrated there, a repeating time sequence of time intervals $T_A$, $T_B$, $T_C$ . . . , $T_N$ is provided during which the data transmission facility 28 is operative on the corresponding frequencies $F_A$, $F_B$, $F_C$ . . . , $F_N$ using known frequency stepping techniques. The individual time intervals such as interval $T_A$ consist of a sequence of time-shared data transmission periods illustrated in timing diagrams 36 and 38. Diagram 36 illustrates the transmission periods for the interval $T_A$ by the facility 28 under the control of the CPU station 32 and includes a sync burst 40 having a squarewave modulation pattern to provide synchronization information for the individual mobile vehicles. The synch burst 40 is directly followed by a framing burst 42 to identify the reference time called framing for subsequent equally spaced transmission time-slot intervals 44. Each of the transmission slots 44 is typically assigned to an individual mobile vehicle in the transportation system of that organization, using a time-slot acquisition routine described below, and the assigned mobile vehicle will become synchronized with the sync 40 and frame 42 and will thereafter search for data within its assigned time slot. The assigned time slot is designated by a unique device code associated with the mobile which is transmitted by the central station 28 and CPU 32 during one of the aforementioned equally spaced time intervals called, time slots. The interval timing diagram 38 illustrates the reception format for the communication facility and accordingly the transmission format for the system of mobile vehicles. The format 38 includes an initial monitor interval 46 during which the communication facility 28 and CPU station 32 listen to receive an indication of channel use for voice by either the channel dispatcher or any of the mobile operators as will be described below. Mobile transmitting time slots 48, which are the data station receiving time slots, are assigned to individual vehicles as are time slots 44 for data station transmission and vehicle reception. Typically, a mobile transmission slot 48 and a receiving slot 44 several intervals prior will be assigned to the same vehicle. It will be appreciated that the slots 48 are interleaved in time sequence with the slots 44 with a sufficient dead time between each of the slots to account for transmission time delays. Typically, the entire multiplex pattern 36 or 38 will occupy approximately one second and each of the slots 44 or 48 will account for approximately 25 msec, thereby providing two-way data communications to approximately 40 vehicles per second. The pattern 36 or 38 can be adjusted in duration to match the size of fleet on each of the several frequencies served.

The communication equipment complement in each of the vehicles 16 and 18 is best illustrated in FIG. 6 in association with the timing diagrams of FIGS. 3-5. The FIG. 6 communication system includes an antenna 50 and duplexer 52 for switching the antenna 50 between a VHM FM receiver 54 and FM transmitter 56. The switch 52 and receiver 54 and transmitter 56, together with squelch 62, audio 64, handset 66, speaker 68, modulator 90 and keying circuit 128, referenced below, are typically available as off-the-shelf communication equipment for mobile vehicles. The output of the receiver discriminator circuit 58 provides a received replica of the data and voice signals transmitted from station 28 or stations 24 and 26 and is applied to a synchronization and bit detector circuit 60, the squelch-tone detector circuit 62 and the receiver audio section 64. The output of the audio section 64 is applied to the speaker of handset 66 and to panel-mounted speaker 68 having a gated input provided from the output of the squelch-tone detector 62 which in common practice disables the speaker 68, except in response to a predetermined tone signal transmitted from the dispatcher voice base station 24. The tone signal may be turned on remotely by the dispatcher to effect voice broadcast to all mobiles of his fleet.

The output of the sync and bit detector circuit 60, which is enabled only during preselected intervals for sync and frame messages 40 and 42 as defined by a time base counter 70 driven by an oscillator 72, is applied to a signalling decoder 74. Prior to the establishment of synchronization, a call progress control circuit 76 provides a sync window override signal to continuously enable the decoder 74 to accept sync and frame messages at any time. After the first sync and frame messages 40 and 42 are received, the corresponding output to the controller 76 causes sync window override to be removed and the counter 70 to be reset, establishing synchronization. Thereafter, the signalling decoder responds only to sync and frame messages 40 and 42 within the sync window. The sync message 40, a squarewave envelope, followed by the frame code 42 is recognized by the signal decoder 74 and the occurrence of this signal is marked on a separate line output to the call progress control circuit 76. Additional codes detected by the decoder include a device code, an acknowledgement signal, a buffer request signal, a force-clear signal, an actuation command signal and a display command signal, to be described below.

The device code 77 [FIG. 5] signal occurring in the time slot assigned to that vehicle is applied through the call progress control 76 to a time-slot address buffer register 78 to store the contents of the time-base counter 70 indicative of the precise moment of occurrence of that signal in the repeating multiplex sequence of waveform 36. Subsequent occurrences of ths specific time point in the repeating multiplex sequence are detected by a time-slot detector 80 as a coincidence of the digital number in the counter 70 and register 78, and is used as an input to the call progress controller 76. The decoder 74 recognizes the device code for the specific vehicle identification by means of comparison of the received data pattern with a unique mobile identifier code stored in a terminal identification memory 82. The occurrence of the pattern match in the signal decoder 74 is indicated to the call progress control circuit 76 by a voltage pulse on the device code line at the input to the call progress control circuit 76.

The device code detection signal is also applied through the call progress control circuit 76 to a reply message programmer 86 which, in the case of the device code, applies the terminal identification code from the ROM 82 through a status buffer 88 to modulator 90 of the transmitter 56, causing the transmitter 56 to transmit to the central CPU station 32 the terminal ID or device code as an acknowledgement signal in a time slot 48 a predetermined interval subsequent to the time slot 44 in which the device code was received. Transmission occurs from control circuit pulsing of keying circuit 128. The fixed lag of the transmitter reply falls within a reply message interval 48 which is nonoverlapping with the base stations transmissions 44.

In the preferred embodiment, the actual lag is several time slots after the first available reply interval 48, following the received time slot 44. This delay permits the transmitter to come to full power and its frequency to stabilize prior to transmission.

In the next multiple scan, and on the same time slot 44 in which the original device code 84 was transmitted, the central station 39 will cause transmission of an acknowledgement code. The detection of the sync 40, frame 42 and the acknowledgement 87 [FIG. 5] results in an output pulse on the ACK line to the call progress control circuit 76 which in turn advances in state to terminate the time slot acquisition process into a normal processing mode for responding to further messages. Failure to detect either frame 42 or acknowledge 87 prevents the call progress control circuit 76 from advancing, and the reply message is not triggered. Among the messages which may then be transmitted in that assigned time slot are the buffer request message 92 [FIG. 5]. The fixed format portion of this message is detected by the signalling decoder 74, which produces an output pulse applied through control circuit 76 to cause a fetch address buffer 94 to store the variable portion of the request message 92 as the fetch address. Control circuit 76 passes only those buffer request messages associated with the assigned time slot identified by the output of the time-slot detector 80 applied to buffer register 94, when that vehicle time slot occurs. The fetch address identifying data in buffer 94 is applied as a register identification to a keyboard message buffer 96 and to the status buffer 88 to identify which portion of the buffer memory is to be applied to the reply message programmer 86 for connection to the modulator 90 and transmission back to the CPU station 32. For this purpose, the buffer memory 96 includes an input from a keyboard 98 which can place a series of messages into the buffer memory 96 at addresses identified by the keyboard pointer register 100. The address identified by the keyboard message pointer register 100 is advanced by an increment switch 102 to permit each successive character entered from keyboard 98 to be placed sequentially in the buffer 96. The location of the most recent keyboard character in the buffer 96 is indicated by the value of the pointer in register 100 which, in turn, is stored in the status register 88.

The status buffer register 88 has provision for recording the reading of an odometer 104, the output of additional vehicle sensors 106 such as engine condition sensors, a buffer for an emergency alarm input from an alarm detector 108, as well as activation of a push-to-talk button 110 on the hand set 66 indicative of a desire for the operator to use voice communication. The output of the status buffer register is applied to the reply message programmer 86 for transmission through the modulator 90 and transmitter 56 to the central station 32. The particular buffer register whose contents is to be transmitted is specified by the output of the fetch address buffer 94 in response to the particular address that is the variable portion in the buffer request message. The requested buffer may be an addressed register in the keyboard buffer 96 or the entire status buffer 88.

The call progress control circuit 76 also responds to display commands and actuation command messages 111 and 109 respectively detected by the signalling decoder 74 in the control messages from the assigned time slot 44 as defined by the time-slot detector 80 to respectively activate a display buffer 112 and an actuation code buffer 114. The display buffer 112 is activated in response to detection of a display command format by decoder 74 to store the variable data of the received message and display it in a display 113 to indicate any of several preselected data such as a change in load status or change in routing for freight on board. The actuation code buffer 114 similarly stores the variable field of actuation messages in the mobile's time slot in response to the actuation command pulse from the decoder 74 through the control circuit 76. The actuation data in buffer 114 is decoded by an actuator 118 to produce a control voltage on one or more of several lines to activate a ring circuit 120 to provide an audible signal to a selected driver as an alternative to speaker activation from the squelch-tone detector 62. The ring actuation is an indication of dispatcher desire to initiate voice contact. The actuator 118 also receives data decoded to cause enabling of the speaker 68 for voice communication. In this manner, the speakers may be turned on in one or several mobiles selectively when the dispatcher remotely deactivates the tone at the voice base station. Additional actuation codes decoded by the actuation decoder 118 are used to activate a channel selector 122 in order to change the frequency of the radio set as may be required when the mobile moves to a service area better covered from another base station.

Finally, reception of a force-clear message 124 in the assigned time slot is detected by the signal decoder 74 to reset the call progress control circuit 76 to a condition of awaiting the receipt of a device code and clear the time-slot address buffer 78 to prevent system transmission or reception.

Voice communication from the communication set of FIG. 6 is provided from the microphone in hand set 66. Its signal is applied directly to the modulator 90. The activation of the push-to-talk button 110 operates keying circuit 128 to activate the transmitter 56 for voice transmission and to switch the transmit receive selector 52 for connection of the transmitter 56 to the antenna 50.

The transmitter 56 is also controlled by a transmit mute signal from the call progress control circuit 76 which prevents transmission of a carrier except during the vehicle assigned reply interval 48, or during intervals where the manual push-to-talk key 110 is depressed. The mute signal typically a screen grid control allows early transmitter activation to permit frequency stabilization without jamming from the several vehicles of the fleet which would otherwise occur during the transmitter early turn-on interval.

A high precedence monostable flag register 130 is set in response to the push-to-talk button 110 or emergency alarm sensor 106 to apply a transmit command signal to the call progress control circuit 76. The transmit command, together with the time-slot strobe signal from the time-slot detector 80 causes the call progress control circuit 76 to generate a status buffer request to the programmer 86 and a high precedence status message is thus sent to the CPU 32, such as message 131 [FIG. 5] described below.

In the operation of the FIG. 6 circuitry, the time base counter 70 is reset at a frequency which is a multiple of the normal repetition frequency of the transmissions from the data station 28. As a result, the sync window from the time base counter 70 and the time-slot strobe from the time-slot detector 80 occur in a repeating sequence indicated in intervals 132 of FIG. 3 which is more frequent than the normal base station frame transmission times 134. FIG. 4 identifies the point of occurrence of the frame signal in each of several time intervals, $T_A$, $T_B$ and $T_C$, as being in staggered sequences represented by the shaded bars 136, 138 and 140, respectively. Intermediate the times of repetition of the individual frames 136, 138 and 140 which may occur, for example, once per minute, the time-slot detector 80 will identify several additional intervals represented by the intervals 132 and which may occur at, for example, five-second intervals. This permits essentially immediate transmission of the high precedence status message at a time other than the normal data communication internals on each frequency.

High precedence messages from the dispatcher office are similarly transmitted selectively to one or more vehicles in one or more appropriate time slots 44 associated with the normally used frame times 134, or in normally unused frame intervals 132 whichever occurs first after the dispatcher's precedence command. Such a high precedence message might be a request for voice communication exemplified by data for activation of the ringer 120, or for display of other pertinent information on the display 116.

The activation of the high precedence flag register 130 and coincidence of the time-slot strobe from detector 80 results in the transmission of a high precedence message from the vehicles to the CPU station 32. As described below, the reply message programmer 86 operates in much the same way as a buffer request control message would with automatic identification of the register in the status buffer register system 88 containing the indication from the press-to-talk button 110 or emergency alarm 106. The time-slot detector 80, again cycling on the five-second intervals will repeat this process at intervals indicated by intervals 132 until internally timed out.

Additionally, it can be seen that activation of the push-to-talk button 110 is operative through the keying circuit 128 and the precedence flag 130 to cause ID data keying from the call progress control 76 that causes transmission of the terminal ID from ROM terminal ID circuit 82, through buffer 88 so as to identify the source of the manual transmission to the CPU station 32.

Although sync messages 40 and frame messages 42 cannot normally be received by the mobile when the manual PTT key is actuated, the data transmitted from the mobile will nevertheless continue to be properly synchronized to the vehicle's assigned time slot where a stable oscillator 72, frequency divider 70 and time-slot detector 80 are employed.

Similarly, the base station's monitor interval 46 in the timing format 38 of FIG. 2 occurs repeatedly and precisely in all of the time intervals $T_A \ldots T_N$ on all frequencies in order to permit high precedence data from the individual vehicles to the central station and dispatcher in intervals between the normal data transmission times for that station.

Accordingly, both the central station 32 and mobiles 16 have the ability to transmit and receive data at the exemplary five-second intervals. Data from the dispatcher through the central processing unit station 32 and central communication facility 28 for time-slot assignment through the device code data format and acknowledgement code data signals may be sent selectively to mobiles which receive information data on actuation and display codes for use by the display 116, ringer 120 and channel selector 122. Additionally, a request for data from the central system is received as a buffer request code causing transmission of an addressed register in the status register buffer system 88, or keyboard message buffer 96, while a forceclear code resets all timing circuits at the vehicle to essentially clear the vehicle out of the assigned communication sequence, awaiting receipt of its device code.

Figure 7:
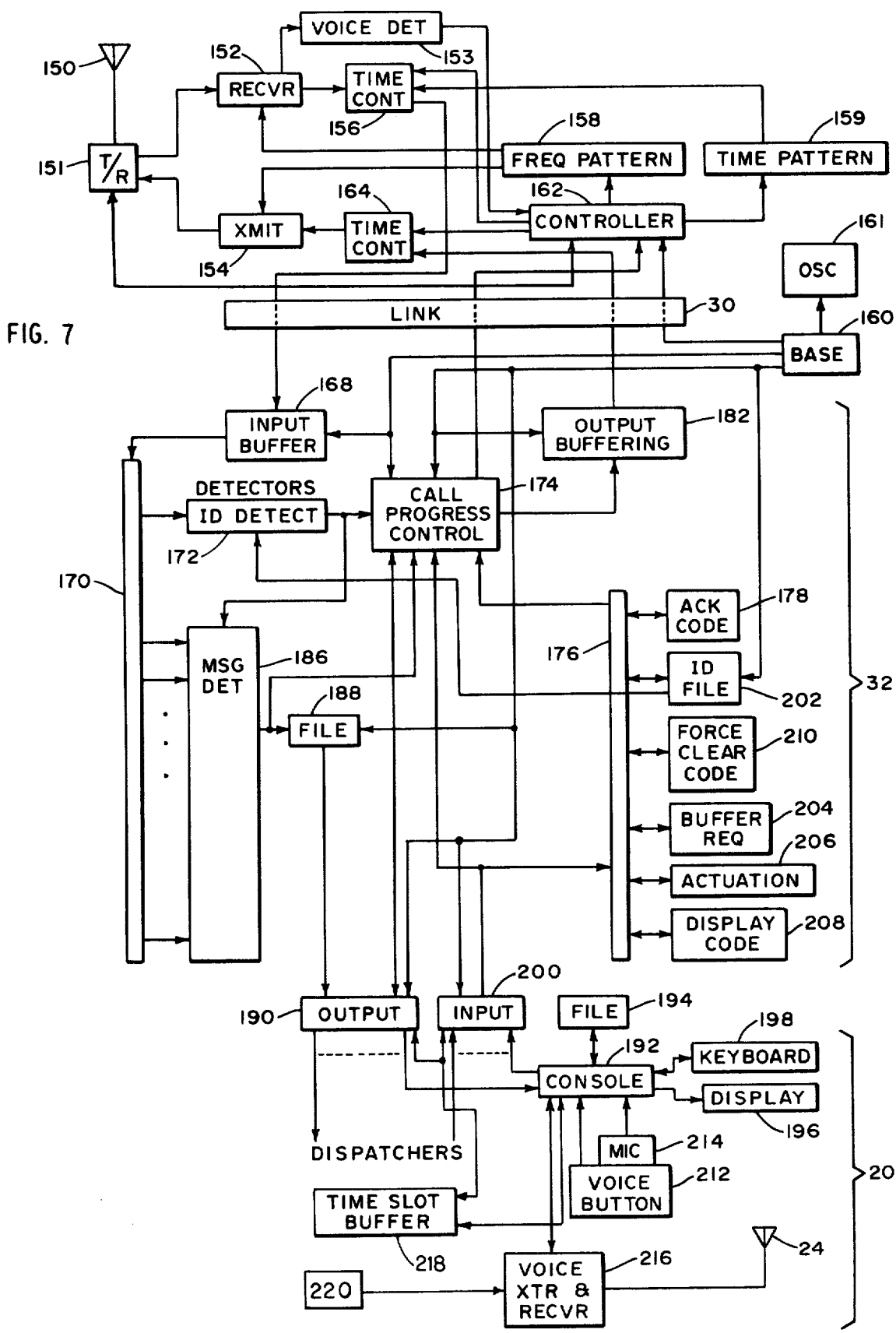
FIG. 7 is a diagram of electronic elements located at central and dispatcher terminals in accordance with the present invention.

The fixed base system for the present invention is more fully illustrated with respect to FIG. 7 showing the data and voice transmission systems, as well as the central processing unit station 32 and one exemplary dispatcher station 20. As shown in FIG. 7, an antenna 150 for data signal transmission and receiving is connected alternately by means of a transmit or receive switch 151 controlled by a time base controller 162 to a receiver 152 and transmitter 154 for time shared communication. The output of the receiver 152 is applied to a time controller 156 while a voice detector 153 responds to the signals of the receiver 152 to signal the controller 162 the presence of voice signals on the transmission channel. The receiver 152 and transmitter 154 are controlled by a frequency pattern generator 158 which is operated through the controller 162 by a time base generator 160 driven by a master oscillator 161.

Using known techniques of multiplexing, the time base generator 160 provides a set of switching signals on a plurality of output lines. Together, the signals on the lines identify each of the time slots for transmission and reception as shown in the diagrams 36 and 38, as well as the individual bit positions in each time slot. The set of switching signals are employed throughout the unit 32 to provide synchronous data flow as described below. Briefly, though, this set of signals is used to address each register in buffers within the unit 32 in the sequence of time slots to activate each register for data input or output in a corresponding time slot. This synchronous time shared, bookkeeping technique thus associates each register with a particular time slot and vehicle. The time base generator 160 applies the set of switching or demultiplexing signals through the controller 162 to frequency pattern generator 158 to provide frequency switching in accordance with the timing diagram 34 of FIG. 2. Switching of frequency is achieved, for example, by enabling frequency determining crystals within the receiver 152 and transmitter 154. The switched crystals define the different frequencies, $F_A$–$F_N$, of operation of the system.

The output of the receiver 152 is applied to a time controller 156 which responds to the set of switching signals from the controller 162 for the receive slots 42 to gate the received data through the time controller 156 to an input buffer 168 during those intervals. The time controller 156 also resynchronizes the bit signals from the receiver 152 in response to a timing pattern from the timing pattern generator 159 as applied through the controller 162 from the time base generator 160. The time pattern generator 159 generates a pattern of clocking signals in accordance with the receive frame signals 48 to reclock, using known techniques, the signals from the time controller 156 in accordance with the several bit positions within each frame 48 so that the data from the time controller 156 to the input buffer 168 is synchronous. Such resynching techniques may employ a digital shift register in conjunction with a specified code detector circuit to identify the specific timing of incoming data and adjust the point of data detection in the shift register in accordance therewith. Memory locations in buffer 168 are enabled at corresponding times by the demultiplexing signals from controller 162 to accept received data. This synchronous operation insures that all data from each vehicle is applied to a unique memory location in buffer 168 identified with that vehicle.

Similarly, each respective register in the output buffer 182 for the particular time of transmission assigned each vehicle is identified by signals from the time base generator 160 to apply the data in the corresponding register through the data link 30 to the time controller 164. Controller 164 is gated to transmitter 154 by the set of switching signals from controller 162 during transmit time slots. The data is applied to the registers in the buffer 182 is a manner to be described below.

Incoming data in the input buffer 168 is available to a data bus 170 where a set of detectors identify the type of message. An identification (ID) detector 174 responds to data on the bus 170 to provide an output indication to a call progress control circuit 174 of the recognition of a specific vehicle ID in conjunction with the data in an ID file 202 which contains a plurality of registers each having a specific vehicle ID correlated to the time slot for that vehicle as pre-established or as defined from input data of the dispatcher to be described below. The registers of the ID file 202 are connected to the ID detector 172 by the timing signals from the time base generator 160 such that each vehicle identification code in file 202 is applied to the ID detector 172 at the particular time when the ID signal is anticipated to be received from that vehicle in the signal applied to detector 172 on bus 170. A match output identifying receipt of the proper ID data is applied to a call progress controller 174 and message detectors 186 described below.

In typical operation, an ID signal is transmitted from the vehicle and received by the receiver 152 in response to a request for communication with a vehicle initiated at the central processing unit 32 by the transmission of the vehicle ID data as selected from the file 202 in a particular time slot identified by the time base 160. The selected ID data is routed through output bus 176 to call progress controller 174 and through the output buffer 182 to the time controller 164 for transmission in that time by the transmitter 154.

The match indication from the ID detector 172 is gated in the call progress control circuit 174 to apply an acknowledge code from a file 178 into the output buffer 182 by way of bus 116 and controller 174, in the corresponding time slot identified by the time base 160 for transmission to the mobile vehicle. The acknowledge code indicates that the identification signal was received and that communication has been established between the central station and the mobile vehicle. A lack of a match output or error condition from the ID detector 172 causes the call progress control circuit 174 to select respectively a retransmission of the vehicle ID or the force clear code from a file 210 for transmission through the output buffer 182 at that same time slot.

As indicated above, where a proper ID in the correct time slot is detected and the acknowledgement signal is transmitted, the remote vehicle will continue to transmit its ID signal in the appropriate time slot as part of the vehicle status message which will be detected by the ID detector 172 to maintain the call progress control circuit 174 in a condition to permit continued communication with that vehicle. The match indication from the ID detector 172 is also applied to message detectors 186 to update a file 188 with current status data from the respective mobiles.

Other messages which may be transmitted by station 32 include a buffer request code, an activation code, and a display code from registers 204, 206, 208 respectively.

The effect of these messages at the vehicle is shown above. The buffer request causes the vehicle to transmit data from a specified buffer register in the keyboard message buffer 96 (FIG. 6), this message having no ID code. In the case of received keyboard data 213 [FIG. 5] an identification signal is not detected by detector 172 and the lack of match signal at the output of detector 172 as applied to message detector 186 switches the detector 186 to respond to the incoming data as a keyboard message and to update, the corresponding different portions of the file 188 for keyboard data. Where identical data is received twice as determined by a comparison by the message detector 186, a signal to the call progress control circuit 174 is generated which increments a counter in the controller 174 for the corresponding time slot and vehicle to cause transmission in the next time slot of the next sequential buffer request from the buffer request register 204 to cause the mobile to transmit the next selected data from buffer register in the keyboard and buffer 96. If the detected message is not identical such that the file 188 has been updated, then the buffer request in the call progress control circuit 174 for the corresponding time slot in the vehicle is not incremented thereby causing retransmission of a buffer register for the same data for confirmation purposes.

In circumstances where high priority data transmission is requested, the timing for this high priority data is established within the call progress control circuit 174 in response to the signals of the time base circuit 160 and to indications from the dispatcher station as will be described below.

The contents of the file 188 are applied to an output circuit 190 where it is available to the respective dispatcher stations including the station 20 illustrated in FIG. 7 using the same synchronous data flow as described above to correlate data with a vehicle in accordance with the time slot in which it is available. For this purpose, the timing signals from the time base generator 160 are applied to output circuit 190 as well as the input circuit 200 described below, and to time slot buffer circuit 218 functioning in the same manner as the input and output buffer circuits 168 and 182 described above. This data is applied into a console 192 and file 194 at the dispatcher 20 where it may be recalled by console control to display the information on a display 196. A keyboard system 198 provides data input for the dispatcher operator to communicate through the console 192 and input circuit 200 to the CPU station 32. Typical keyboard data includes a request for assignment of a specific time slot to a mobile vehicle in which case the ID file 202 within the CPU station 32 is activated by the keyboard data gating the control circuit 174 to cause it to output the ID data via the bus 176 to output buffer 182 for transmission to the vehicle thereby initiating the acquisition or hand-shaking system to acquire and assign a time slot to a particular mobile vehicle described above. Additional keyboard 198 commands from the dispatcher 20 are used to force activation of the buffer request codes from the register 204, actuation codes from the register 206 and display codes from the register 208, as well as the force clear signal from the register 210 under gating control by circuit 174 at the times assigned to the particular vehicle from time base information from generator 160. The request from the keyboard 198 is also correlated to a particular time slot from synchronizing signals from the time base generator 160. Additional keyboard data identifies changes in loading status or routing for on board data.

A voice button 212 in the dispatcher 20 also applies data through the console 192 causing output of ring indication data from the actuation register 206 that results in the transmission of data to the identified vehicle for activation of the vehicle ringer 120. Voice signals from a microphone 214 associated with the voice button 212 are applied through the console 192 to a voice transmitter and receiver 216 and antenna 24 for voice communication with the vehicle. Optionally, the button 212 activates the transmitter end receiver 216 to transmit a tone from source 218 that is detected by the vehicle's squelch tone detector 62.

The status message 131 in FIG. 5 has been described above as a response for the plural mobile vehicles to specified data received in the assigned one of the time slots 44 in FIG. 2. Optionally or additionally the call progress controller 78 includes gatting to respond to the synchronizing burst 40 as sufficient to actuate the transmission of the status, or default message 131 in the assigned one of the time slots 48 through programmer 86. Where specific different buffer request data is received, the call progress control 76 is gated as described above to cause transmission of data from the specified register. The optional control for a default transmission of the status data further greatly reduces the amount of transmission time for the base station 28 which is of significance in urban areas where transmission facilities for many frequencies are closely grouped and interference probabilities between them are great.

The above-described preferred embodiment for the present invention is intended to be exemplary in scope only and not to be a limitation on the extent of the basic invention as defined in the following claims.

What is claimed is:

1. A voice and data communication system for use between at least one base station and a plurality of mobile stations comprising:
   mobile station located means for transmitting and receiving data and voice signals on a single assigned frequency between said base station and the mobile station;
   means associated with said base station for transmitting and receiving voice and data signals between said mobile station and said base station;
   means associated with said base station for providing a sequence of separate time periods in a repeating interval for data transmission to corresponding ones of said plurality of mobile stations;
   means for providing reception of data signals from said plurality of mobile stations intermediate the periods of data transmission in a noninterfering pattern;
   means associated with each of said plurality of mobile stations for synchronizing to the pattern of data transmission and reception for said base station to identify times for data reception and transmission by that mobile station;
   operator actuable means associated with at least one of said base and plurality of mobile stations for providing an indicia of operator desire for voice communication for transmission therefrom in the assigned frequency; and
   means for responding to said indicia as received for initiation of voice communication during data transmission and reception on the assigned frequency.

2. The system of claim 1 further including:
means for providing high priority communication of data signals between said base station and a mobile station at times more frequent than the identified times for that mobile station.

3. The system of claim 1 further including:
means associated with each of said plurality of mobile stations for responding to a predetermined data signal to indicate a condition.

4. The system of claim 3 wherein said condition indicating means includes an indicator of a change in the assigned frequency.

5. The system of claim 3 wherein said condition indicating means includes an indicator of a change in at least one of mobile station routing, load status, and freight routing for on board freight.

6. The system of claim 1 further including:
means operative at each of said plurality of mobile stations for storing data signals representative of mobile station information to be transmitted in addressable locations; and
means associated with said mobile stations for responding to predetermined received data including storage location address indicia for transmitting the data signals stored in the corresponding storage locations.

7. The system of claim 6 further including means operable in the absence of said location address indicia for transmitting data in a predetermined storage location.

8. The system of claim 6 including:
means for transmitting from said base station transmission means data signals representative of location address indicia.

9. The system of claim 1 wherein:
said operator actuable means includes means for providing transmission of a predetermined data signal from said base station representative of a request for voice communication with a mobile station at a time period corresponding to said mobile station; and
said responding means includes means associated with said mobile stations and responsive to reception of said predetermined data signal at the corresponding time for providing an indication of a request for voice communication between that mobile station and said base station.

10. The system of claim 1 wherein:
said operator actuable means includes means for generating a tone for transmission on the assigned frequency; and
said responding means includes audio sound means and means for activating the audio sound means in response to said tone as received.

11. The system of claim 1 further including:
means associated with said base station and each of said plurality of mobile stations for synchronizing each mobile station to a separate transmission and reception period in the time sequence of repeating intervals by transmission and reception of vehicle identification codes.

12. The system of claim 1 wherein said voice and data signal transmission and reception means associated with said at least one base station includes separate communication locations for the voice and data signals respectively.

13. The system of claim 12 further including a dispatcher associated with each voice communication location and having a voice communication path to mobile stations through the associated voice communication location and a data communication path to mobile stations through said base station.

14. The system of claim 1 further including:
a plurality of mobile station subgroups;
means associated with said base station for defining the repeating time sequence of intervals at a plurality of frequencies; and
means for providing communication between said base station and said plurality of mobile stations over different frequencies for each of the subgroups of said plurality of mobile stations.

15. The communication system of claim 1 further including means associated with each of said plurality of mobile stations for responding to a predetermined data signal to indicate an alarm condition.

16. The communication system of claim 1 further including means associated with said responding means for providing an indication of the desire for voice communication.

17. A vehicle communication system comprising:
a plurality of mobile vehicles;
a base station;
means for providing data signal communication between said base station and each of said plurality of mobile vehicles in a time sequence having:
a plurality of communication intervals occurring in a repeating pattern;
each interval using a separate frequency for communication;
each interval having an initial data signal identifying the interval and its timing and a plurality of subsequent periods of time for data signal transmission from said base station to a corresponding vehicle, interleaved with a plurality of time periods for data signal reception from a mobile vehicle associated with a prior transmission time period;
means associated with each of said plurality of mobile vehicles and said base station for assigning unique time periods for communication between said mobile vehicle and base station;
means for providing voice communication from said base station over each of said plurality of frequencies;
means for providing voice communication from each of said plurality of mobile vehicles to said base station over the same frequency used for data signal communication with that vehicle;
means associated with at least one of said base station and plurality of mobile vehicles for transmitting indicia of a desire for voice signal communication;
means for detecting the indicia of a desire for voice signal communication between said base station and one or more of said plurality of mobile vehicles;
means for providing data communication between said base station and mobile vehicles under predetermined conditions of priority data at times other than assigned time periods;
means for storing data representative of vehicle information and a plurality of status conditions associated with each of said plurality of mobile stations;
keyboard means for manually entering vehicle information data into said storage means;
vehicle located means responsive to predetermined data in each assigned time period for transmission of corresponding data from said storate means during a subsequent assigned time period;

means associated with each of said plurality of mobile vehicles for providing an indication of predetermined data signals received thereby.

18. A communication system for use between at least one base station and a plurality of mobile stations comprising:
mobile station located means for transmitting and receiving data signals on an assigned frequency between said base station and the mobile station;
means associated with said base station for transmitting and receiving data signals between said mobile station and said base station on the assigned frequency;
means associated with said base station for providing a sequence of separate time periods in a repeating interval for data transmission to corresponding ones of said plurality of mobile stations;
means for providing reception of data signals from said plurality of mobile stations intermediate the periods of data transmission in a noninterfering pattern;
means associated with each of said plurality of mobile stations for synchronizing to the pattern of data transmission and reception for said base station to identify times for data reception and transmission by that mobile station; and
means for providing high priority communication of data signals between said base station and a mobile station at times more frequent than the identified times for that mobile station.

* * * * *